United States Patent [19]

Yamashita

[11] 4,110,245

[45] Aug. 29, 1978

[54] GREEN COLORED FILTER GLASS

[75] Inventor: Toshiharu Yamashita, Hachioji, Japan

[73] Assignee: Hoya Corporation, Tokyo, Japan

[21] Appl. No.: 856,896

[22] Filed: Dec. 2, 1977

[30] Foreign Application Priority Data

Dec. 2, 1976 [JP] Japan ................................ 51-145151

[51] Int. Cl.[2] .......................... C03C 3/16; C03C 3/30; F21V 9/08; G02B 5/22

[52] U.S. Cl. ................................. 252/300; 106/47 R; 106/47 Q

[58] Field of Search ............ 252/300; 106/47 R, 47 Q

[56] References Cited

U.S. PATENT DOCUMENTS

| | | | |
|---|---|---|---|
| 3,751,272 | 8/1973 | Izumitani et al. | 106/47 Q |
| 3,785,835 | 1/1974 | Izumitani et al. | 106/47 Q |
| 3,798,041 | 3/1974 | Izumitani et al. | 106/47 Q |
| 3,923,527 | 12/1975 | Matsaura et al. | 106/47 Q |

*Primary Examiner*—O. R. Vertiz
*Assistant Examiner*—Mark Bell
*Attorney, Agent, or Firm*—Sughrue, Rothwell, Mion, Zinn and MacPeak

[57] ABSTRACT

A green colored filter glass comprising (a) 100 parts by weight of a base glass consisting of, by weight, 40 to 85% $P_2O_5$, 2 to 10% $Al_2O_3$, 0 to 53% BaO, 0 to 15% $Li_2O$, 3 to 53% BaO + $Li_2O$, 0 to 15% NaO and/or $K_2O$, 0 to 10% MgO, CaO, ZnO and/or PbO, 0 to 20% SrO and 0 to 5% $B_2O_3$, $ZrO_2$, $TiO_2$ and/or $La_2O_3$;

(b) 0.01 to 3.0 parts by weight of NiO; and (c) 0.02 to 3.0 parts by weight of CuO.

1 Claim, 1 Drawing Figure

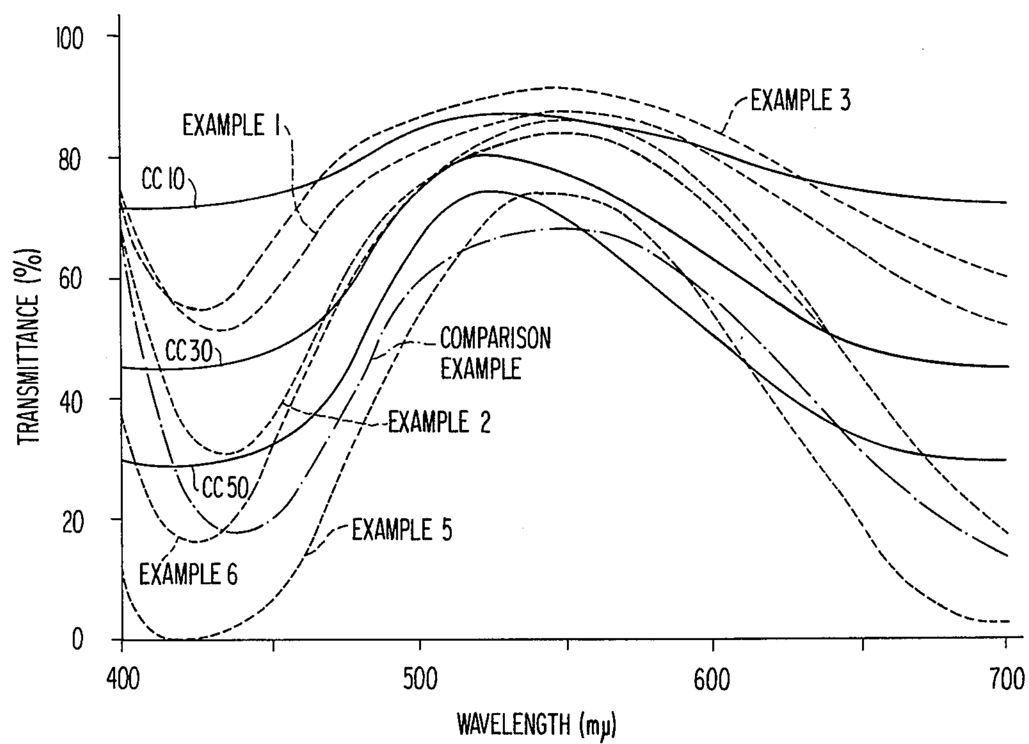
100
80
60
40
20
0
TRANSMITTANCE (%)
400
500
600
700
WAVELENGTH (mμ)
EXAMPLE 1
EXAMPLE 3
CC 10
CC 30
CC 50
COMPARISON EXAMPLE
EXAMPLE 2
EXAMPLE 5
EXAMPLE 6

GREEN COLORED FILTER GLASS

BACKGROUND OF THE INVENTION

1. Field of the Invention

This invention relates to a color-correcting green colored filter glass which selectively absorbs light having wavelengths both in the range of about 400 to about 500 mμ and in the range of about 600 to about 700 mμ and which has a high transmittance in the wavelength region of about 500 to about 600 mμ.

2. Description of the Prior Art

In color printing, gelatin films which selectively absorb the wavelengths of blue, red, green, yellow light, etc. have heretofore been conventionally used as color-correcting filters. A gelatin filter has advantages because the coloring is relatively easy, whereby filters having various colors can be easily obtained and because the production cost for gelatin filters is low. On the other hand, a gelatin filter has the defects that, since deterioration in quality and discoloration tend to occur during use, in order to obtain a stable print in a consistent manner the filter must be exchanged within relatively short periods of time. For this reason, gelatin filters are not suitable for incorporation into devices with complicated mechanisms where exchange is difficult.

Conventional colored glasses have a color tone similar to that of gelatin filters, but the light absorption characteristics of conventional colored glasses are inferior to those of gelatin filters and, therefore, conventional colored glasses are not suitable for use in color correction.

SUMMARY OF THE INVENTION

As a result of extensive investigations on the relationship between the light absorption characteristics and the composition of a glass containing nickel ion, it was found that the absorption of the nickel ion varies depending upon the type of network modifiers, e.g., an alkali metal oxide such as $Li_2O$, $Ma_2O$ or $K_2O$; an alkaline earth metal oxide such as MgO, CaO, SrO or BaO; ZnO or PbO, in the glass, that BaO and $Li_2O$ components enhance absorptions of light with wavelengths of about 600 to about 700 mμ and simultaneously provide an extremely high transmittance of light with wavelengths of about 500 to about 600 mμ, and that a green colored filter glass having sufficient chemical resistance and color stability can be obtained.

Based on the above-described facts, the present invention makes it possible to obtain a green colored filter glass which selectively absorbs light with wavelengths both in the range of about 400 to about 500 mμ and in the range of about 600 to 700 mμ and which has a high light transmittance at the wavelength region of about 500 to about 600 mμ by selecting a $P_2O_5$-$Al_2O_3$-BaO and/or $Li_2O$ system glass as a base glass and adding NiO and CuO to the base glass.

An object of the present invention is to provide a green colored filter glass which makes it possible to easily obtain various absorption densities, has excellent absorption characteristics, has a high transmittance to light with wavelengths of about 500 to about 600 mμ and is free from the defects of gelatin filters.

Accordingly this invention provides a green colored filter glass which comprises (a) 100 parts by weight of a base glass consisting of, by weight, 40 to 85% $P_2O_5$, 2 to 10% $Al_2O_3$, 0 to 53% BaO, 0 to 15% $Li_2O$, 3 to 53% BaO + $Li_2O$, 0 to 15% $Na_2O$ and/or $K_2O$, 0 to 20% SrO, 0 to 10% MgO, CaO, ZnO and/or PbO and 0 to 5% $B_2O_3$, $ZrO_2$, $TiO_2$ or $La_2O_3$;

(b) 0.01 to 3.0 parts by weight of NiO; and (c) 0.02 to 3.0 parts by weight of CuO.

BRIEF EXPLANATION OF THE ACCOMPANYING DRAWING

The FIGURE is a graph showing transmittance curves of the glass filters according to Examples 1, 2, 3, 5 and 6 of this invention, commercially available gelatin filters and a glass filter according to the Comparison Example.

DETAILED DESCRIPTION OF THE INVENTION

If the proportion of $P_2O_5$ and BaO + $Li_2O$ are outside the range of 40 to 85% by weight and 3 to 53% by weight, respectively, and the proportions of BaO and $Li_2O$ exceed 53% by weight and 15% by weight, respectively, stable glasses having a high transmittance in the wavelength region of about 500 to 600 mμ and a reduced tendency to devitrification cannot be obtained.

$Al_2O_3$ is introduced to increase the chemical resistance. If the amount of $Al_2O_3$ is less than 2% by weight, the glass has poor chemical resistance and cannot withstand use, while if the amount of $Al_2O_3$ is more than 10% by weight, devitrification of the glass tends to occur.

MgO, CaO or ZnO deteriorates the transmittance in the wavelength region of about 500 to about 600 mμ, but in order to improve the chemical resistance and hardness of the glass, MgO, CaO and/or ZnO may be added in an amount up to 10% by weight.

SrO, PbO, $Na_2O$ or $K_2O$ is effective to increase the transmittance at about 500 to about 600 mμ, but if the amount thereof is too large, the transmittance tends to decrease and the chemical resistance and hardness of the glass tend to be deteriorated. Therefore, the amounts of SrO, PbO, $Na_2O$ and $K_2O$ are suitably up to 20% by weight, up to 10% by weight, up to 15% by weight and up to 15% by weight, respectively.

$B_2O_3$, $ZrO_2$, $TiO_2$ or $La_2O_3$ is effective to increase the chemical resistance of the glass. If the amount thereof exceeds 5% by weight, the tendency to devitrification of the glass increases.

From the standpoint of density of coloration of the glass, suitable amounts of NiO and CuO are 0.01 to 3.0 parts by weight and 0.02 to 3.0 parts by weight, respectively, based on 100 parts by weight of the base glass. If the amounts thereof are outside the above-described ranges, the glasses obtained are not suitable for the intended use.

This invention will now be illustrated more specifically by reference to the following examples, but this invention is not to be construed as being limited to these examples. Unless otherwise indicated, all parts and percents are by weight.

| Component | Example No. | | | | | | | | | Comparison Example |
|---|---|---|---|---|---|---|---|---|---|---|
| | 1 | 2 | 3 | 4 | 5 | 6 | 7 | 8 | 9 | |
| $P_2O_5$ | 43.9 | 74.8 | 82.0 | 59.0 | 82.6 | 73.7 | 61.9 | 59.5 | 49.9 | 74.8 |
| $Al_2O_3$ | 3.5 | 3.6 | 5.4 | 3.9 | 7.8 | 7.2 | 4.1 | 4.0 | 3.7 | 6.5 |
| BaO | 52.6 | 21.6 | — | 34.8 | — | 5.0 | 24.5 | 18.1 | 32.0 | — |
| $Li_2O$ | — | — | 12.6 | 2.3 | 3.6 | 8.0 | — | — | — | — |
| $Na_2O$ | — | — | — | — | — | — | — | — | 2.2 | — |
| $K_2O$ | — | — | — | — | — | — | — | — | 2.2 | — |
| MgO | — | — | — | — | 2.0 | — | — | — | — | 4.7 |
| CaO | — | — | — | — | 2.0 | — | 9.0 | — | — | — |
| SrO | — | — | — | — | — | — | — | 16.4 | — | — |
| ZnO | — | — | — | — | 2.0 | 5.0 | — | — | — | 14.0 |
| PbO | — | — | — | — | — | — | — | — | 8.0 | — |
| $B_2O_3$ | — | — | — | — | — | — | — | 2.0 | — | — |
| $ZrO_2$ | — | — | — | — | — | 1.1 | — | — | — | — |
| $TiO_2$ | — | — | — | — | — | — | 0.5 | — | — | — |
| $La_2O_3$ | — | — | — | — | — | — | — | — | 2.0 | — |
| NiO | 0.15 | 0.3 | 0.3 | 0.6 | 2.0 | 0.86 | 0.05 | 0.10 | 0.3 | 0.28 |
| CuO | 0.4 | 0.7 | 0.3 | 1.0 | 1.5 | 0.73 | 0.12 | 0.28 | 0.4 | 0.90 |

The transmittance curves of glasses having a thickness of 2 mm obtained in Examples 1, 2, 3, 5 and 6 are shown in the accompanying drawing. As is apparent from the figure, the green colored glass according to this invention selectively absorbs light having wavelengths both in the range of about 400 to about 500 mμ and in the range of about 600 to about 700 mμ which are in the visible light range. Further, these glasses have higher transmittance in the wavelength range of about 500 to about 600 mμ than that of commercially available gelatin filters CC 10, CC 30 and CC 50 (e.g., as disclosed in *Kodak Filters for Scientific and Technical Uses,* 1st Edition, Eastman Kodak Company (1970)) and that of the glass of the Comparison Example which does not contain BaO and $Li_2O$. Therefore, the glasses according to this invention are most suitable as a filter which simultaneously corrects blue and red lights. Further, by adjusting the amounts of NiO and CuO, it is possible to easily obtain color-correcting glasses having various color densities.

The glass in accordance with this invention can be obtained by mixing an orthophosphoric or metaphosphoric acid salt and conventional glass-forming materials, melting the mixture in a ceramic or platinum melter at about 1200° to about 1350° C, stirring and purifying the melt, and either casting the melt into a mold or cooling the melt as while it remains in the melter. Suitable starting raw materials which can be used for the glass of this invention are for the $P_2O_5$ component:

$H_3PO_4$, $M^+PO_3$ (where $M^+$ is Li, Na or K), $M^{2+}(PO_3)_2$ (where $M^{2+}$ is Mg, Ca, Sr, Ba, Zn or Pb), $Al(PO_3)_2$, etc;

for the $Al_2O_3$ component:

$Al_2O_3$, $Al(OH)_3$, etc;

for the $M^+{}_2O$ component:

$CO_3$ or $NO_3$ salts, $M^+PO_3$, etc., where $M^+$ is as defined above;

for the $M^{2+}O$ component:

$CO_3$, $NO_3$ or oxides, etc. where $M^{2+}$ is as defined above;

for the NiO component:

NiO, $Ni(NO_3)_2$, etc;

for the CuO component:

CuO, etc.

While the invention has been described in detail and with reference to specific embodiments thereof, it will be apparent to one skilled in the art that various changes and modifications can be made therein without departing from the spirit and the scope thereof.

What is claimed is:

1. A green colored filter glass which absorbs light with wavelengths both in the range of about 400 to about 500 mμ and in the range of about 600 to 700 mμ and which has a high light transmittance at the wavelength region of about 500 to about 600 mμ, consisting essentially of (a) 100 parts by weight of a base glass consisting of, by weight, 40 to 85% of $P_2O_5$; 2 to 10% of $Al_2O_3$; 0 to 53% of BaO, 0 to 15% of $Li_2O$, with the total proportion of 3 to 53% BaO + $Li_2O$; 0 to 15% of NaO and/or $K_2O$; 0 to 10% of MgO, CaO, ZnO and/or PbO; 0 to 20% of SrO and 0 to 5% of $B_2O_3$, $ZrO_2$, $TiO_2$ and/or $La_2O_3$;

(b) 0.01 to 3.0 parts by weight of NiO; and (c) 0.02 to 3.0 parts by weight of CuO.

* * * * *